Feb. 3, 1948.  G. GUANELLA ET AL  2,435,496
IMPULSE MODULATION SYSTEM
Filed March 13, 1945  3 Sheets-Sheet 1
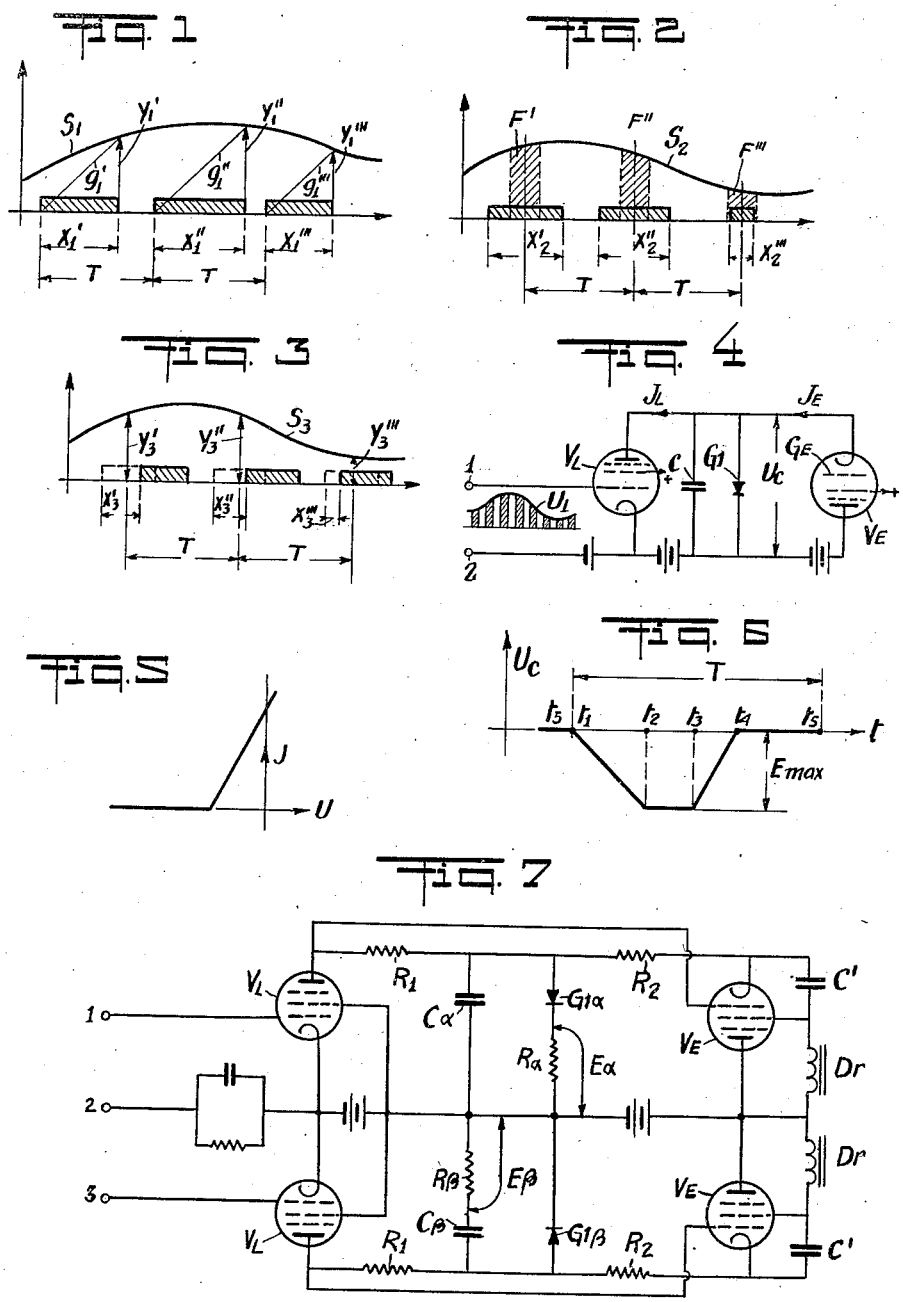
INVENTOR.
Gustav Guanella and
BY Paul Güttinger
ATTORNEY

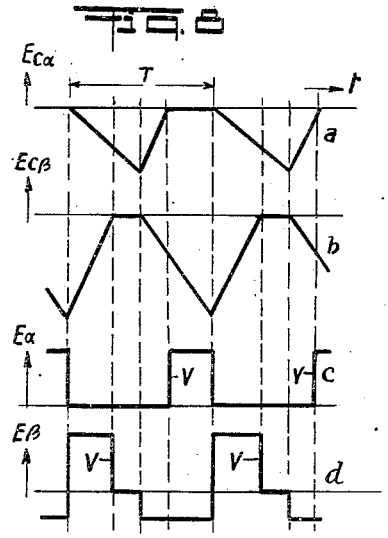
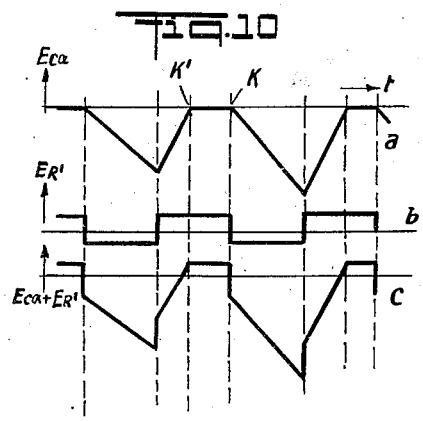
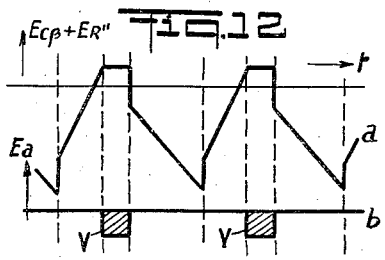
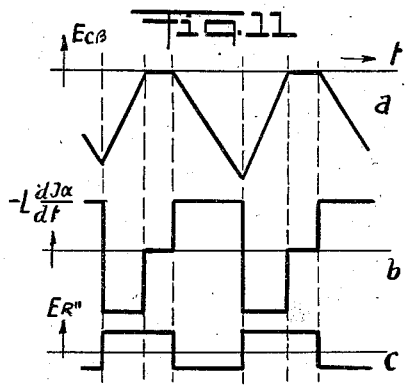
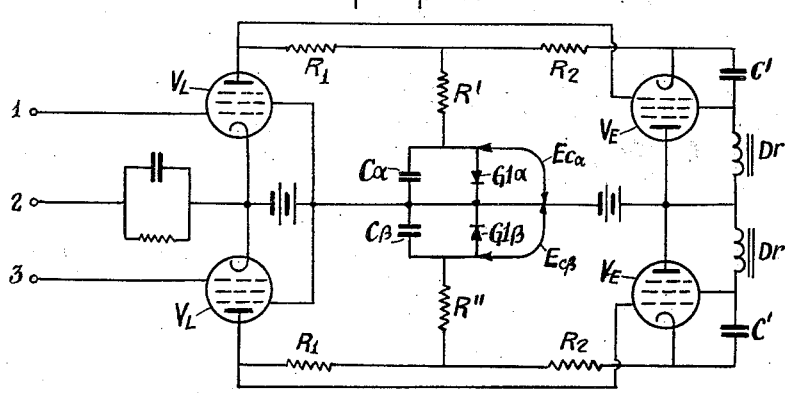

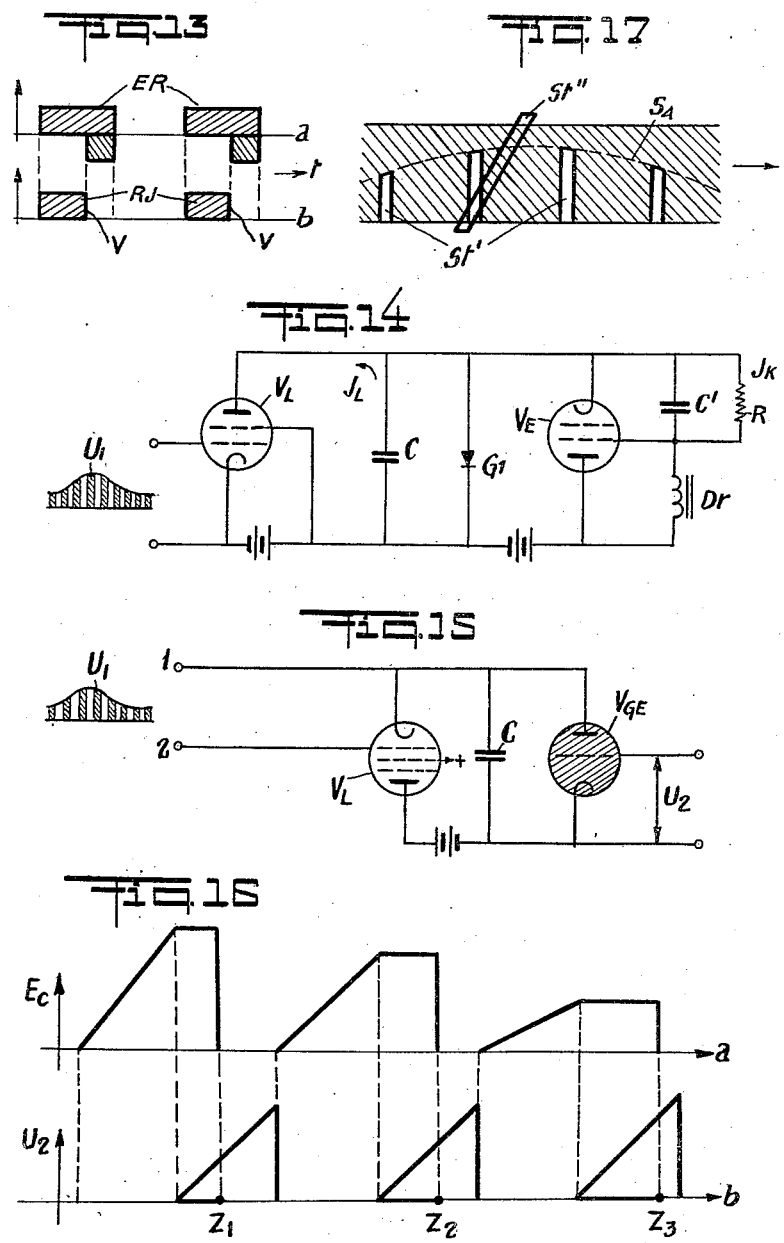

Patented Feb. 3, 1948

2,435,496

UNITED STATES PATENT OFFICE 2,435,496

IMPULSE MODULATION SYSTEM

Gustav Guanella, Zurich, and Paul Güttinger, Wettingen, Switzerland, assignors to Radio Patents Corporation, New York, N. Y., a corporation of New York Application March 13, 1945, Serial No. 582,464
In Switzerland March 16, 1944

23 Claims. (Cl. 179—171.5)

It is known to transmit messages by means of impulses the duration of which is varied according to the modulating signal. With the methods known up to the present, the length of the impulses is influenced according to a variable modulation voltage in such a manner that the position of one impulse edge, i. e., the distance of the edge from the equidistant edges of the other impulses, corresponds to the voltage value of the modulation signal which coincides in time with the edge.

The present invention relates to improved methods of and systems for impulse time modulation of the above type, and will become more apparent from the following detailed description taken in reference to the accompanying drawings forming part of this specification, and wherein:

Figure 1 is a theoretical diagram illustrative of a known type of impulse time modulation;

Figures 2 and 3 are diagrams similar to Figure 1 illustrating the improvements according to the invention;

Figure 4 is a basic electrical circuit for carrying out the invention;

Figures 5 and 6 are theoretical diagrams explanatory of the function of the circuit according to Figure 4;

Figure 7 shows a more complete circuit arrangement for producing impulse time modulation in accordance with the principles of the invention;

Figure 8 is a theoretical diagram explanatory of the function of the circuit of Figure 7;

Figure 9 shows a modification of an impulse time modulation circuit of the type according to Figure 7;

Figures 10–13 are diagrams explanatory of various methods of obtaining time modulated impulse signals;

Figures 14 and 15 are circuits illustrating further modifications for carrying out the invention;

Figure 16 is a diagram explanatory of the function of the circuit of Figure 15; and Figure 17 is a diagram illustrating still another method of realizing the invention in practice.

Like reference characters identify like parts throughout the different views of the drawings.

The known method of impulse time modulation referred to is more clearly understood by reference to Figure 1. After definite time intervals T an impulse is sent out whose length $x_1$ ($x'$, $x''_1$, $x'''_1$) depends linearly on an instantaneous value $y_1$ ($y'_1$, $y''_1$, $y'''_1$) of the voltage of a modulating signal $S_1$. The length of the impulse extends up to the moment where the parallel straight lines $g_1$ ($g'_1$, $g''_1$, $g'''_1$) intersect the curve $S_1$, so that the impulse length $x_1$ is always proportional to the voltage $y_1$. With a small impulse frequency, this method results in considerable non-linear distortion, that is to say, the low frequency signals obtained from the impulses by demodulation, such as by low-pass filtering, contain disturbing components which consist of combined frequencies of the impulses and the signal frequencies or their harmonics.

These disadvantages are avoided according to the present invention which comprises a method and arrangement for impulse modulation wherein the distances of at least one edge of each impulse measured from equidistant points are derived from values of the modulating voltage curve occurring at equidistant times.

The method according to the invention possesses the advantage of a good non-linear distortion factor. When the extreme side band frequencies are suppressed, a normal amplitude modulated high frequency signal remains. If the extreme side bands are also transmitted, the possibility of noise elimination by means of amplitude filtration provides an even greater improvement in reception than with frequency modulation. The arrangement for performing the invention avoids the use of expensive modulation transformers.

Two ways of performing the method according to the invention are explained in the following discussion with reference to Figures 2 and 3 of the drawing. In Figure 2, the lengths $x'_2$, $x''_2$, $x'''_2$ of the impulses are controlled in accordance with the areas $F'$, $F''$ and $F'''$, respectively, obtained from the modulating signal $S_2$. The areas $F$ (average values in time) follow each other at equal intervals T and extend over equally long time integration periods.

It is also possible to change the position of an impulse of constant length as a function of the voltage values, as shown in Figure 3. In this case, both impulse edges are shifted in the same direction as a function of the voltage value $y_3$. The original position of the impulses is shown by dotted lines. The amount of shift $x_3$ is proportional to $y_3$. In this case, the controlling voltages $y_3$ also occur at equidistant intervals of time.

The method according to Figure 2 may be designated as amplitude time modulation and that according to Figure 3 as phase time modulation.

The difference between the new method according to the present invention and the known method will be evident from the drawing. With the known method, the times at which the voltage values for determining the modulation are obtained occur at points whose distances from each other vary substantially, while with the new method the intervals of time T are equal. The different distances with the known edge method, as can be seen in Figure 1, are due to the fact that the voltage values which determine the position of the impulse edges change their position in accordance with the instantaneous magnitudes of the modulating signal if the voltage of the signal $S_1$ is not constant.

With the method according to the invention, the signals determining the modulation are spaced at constant intervals of time T as shown in Figures 2 and 3. These intervals form a period. The left and right impulse edge or the right and left interval edge may be shifted by the same amount in a positive or negative direction. The signal values determining the modulation may also be half a period removed from each other, whereby the left and right impulse edge is controlled alternately in accordance with successive signal values. The signal values determining the modulation may have a greater or lesser time lead depending upon the manner in which the method is applied in practice. The method may also be modified by varying only one edge. According to Figures 2 and 3, the modulation signals extend over an interval of time which is short compared with the duration of a period. According to another modification, the modulation signal voltage may extend over about half a period. The relation between the length of the time-modulated impulses and the signal determining the modulation may be linear, but in certain cases, for instance when changes in the speech or music volume relation are desired, it may be of advantage to use a non-linear relationship.

Several practical examples of apparatus for performing the method according to the invention will be described in the following. Figure 4 shows the fundamental circuit arrangement in diagrammatic form. The grid of the charging tube $V_L$ (pentode) shown in this figure is controlled by amplitude-modulated equally long impulses $U_1$ which are applied to terminals 1 and 2 and whose voltage values represent the shape of the modulating signal in such a manner that, during the duration of the impulses a charging current $J_L$ flows in the anode circuit and tube $V_L$ is completely blocked before and after the impulses. If the curve of the anode current J as a function of the grid voltage V, as shown in Figure 5, is assumed to be an ideal characteristic for charging tube $V_L$, then the shape of $J_L$ will conform with that of $U_1$. Hence, condenser C is charged negatively, its voltage being indicated at $U_C$. After the charging is completed or after a certain time delay thereafter, condenser C discharges through the discharge tube $V_E$ (pentode), whereby the grid $G_E$ of this latter should be controlled in such a manner that tube $V_E$ is blocked during the charging and subsequent delay period. The discharge current $J_E$ is substantially constant due to the pentode $V_E$ acting as a constant current device, and it is essential that only the current $J_L$ or $J_E$ should flow at one and the same time, but never both currents simultaneously. Due to the discharging current $J_E$, the condenser voltage will again increase. From the instant when voltage $U_C$ has become positive, current $J_E$ no longer flows through the condenser but will pass through the parallel-connected rectifier $G_1$ which may be of the dry disc type, a diode, or the like. This rectifier should have a very high blocking resistance and a very small passing resistance. An advantage of this arrangement is the fact that the capacitance of the parallel-connected rectifier does not have any disturbing effect.

The charging and discharging process which covers a complete period $t_1$—$t_5$ is thus divided into the following four intervals shown in Figure 6:

$t_1$—$t_2$: charging period
$t_2$—$t_3$: storage period
$t_3$—$t_4$: discharging period
$t_4$—$t_5$: current flow through rectifier $G_1$.

Points $t_2$ and $t_3$ are always fixed and in the same position; only point $t_4$ exists variable. There is proportionality between the maximum voltage $E_{max}$ at condenser and the time $t_3$—$t_4$, since the discharging current $J_E$ is substantially constant. During the time interval $t_4$—$t_5$, voltage $U_C$ remains constant, since the total current $J_E$ passes through the rectifier $G_1$. It is evident that point $t_4$ which determines the length of the time-modulated impulse depends on voltage values of the modulating voltage curve obtained at equidistant instants of time, since the charging current $J_L$ is controlled by equidistant input voltage values or pulses $U_1$.

Two arrangements for producing time-modulated impulses comprising two separate convertors will now be described in detail. The conditions are particularly simple when the charging time $t_1$—$t_2$ covers half a period and the storage time $t_2$—$t_3$ is zero.

The arrangement shown in Figure 7 comprises a push-pull circuit, wherein the modulating signals are applied in opposite phase to the control grids of a pair of charging tubes $V_L$ by way of input terminals 1, 2 and 3. The output circuits of these tubes include resistances $R_1$, condensers $C_\alpha$ and $C_\beta$, rectifiers $G_{1\alpha}$ and $G_{1\beta}$, and resistors $R_\alpha$ and $R_\beta$, respectively. More particularly, one of the resistors $R_1$ is connected between the plate and cathode of one of the tubes $V_L$ in series with condenser $C_\alpha$, while the other resistor $R_1$ is likewise connected between the plate and cathode of the other tube $V_L$ in series with the condenser $C_\beta$. Condenser $C_\alpha$ and $C_\beta$ are in turn shunted by rectifiers $G_{1\alpha}$ and $G_{1\beta}$, respectively, in a manner similar as shown in Fig. 1. Resistor $R_\alpha$ is connected in series with the rectifier $G_{1\alpha}$ and resistor $R_\beta$ is in series with the condenser $C_\beta$. The screen grid voltages of tubes $V_E$ are stabilized by means of the reactors $D_r$ and condensers $C'$. It is preferable to use a screen grid voltage approximately equal to the anode voltage. Resistances $R_2$ are connected in the cathode leads of tubes $V_E$. The blocking voltage for the control grids of the tubes $V_E$ is produced by means of resistances $R_1$. These resistances are so dimensioned that even the smallest charging current provides the necessary negative grid bias voltage for a complete blocking of tube $V_E$. It is to be noted that with the filtering chokes $D_r$ and decoupling condensers $C'$ not only the voltages at impulse frequency but also low frequency voltages will be smoothed or filtered. With resistances $R_2$ a small grid bias voltage can be obtained.

Figure 8 shows the voltage conditions, $v$ representing the edges of the impulses of variable time position. The charging tubes $V_L$ which are arranged in push-pull connection are alternately blocked and deblocked during each half of period T. $E_{c\alpha}$ and $E_{c\beta}$ represent the voltage at the terminals of the condensers $C_\alpha$ and $C_\beta$, respectively. $E_\alpha$ and $E_\beta$ are the voltages across the resistances $R_\alpha$ and $R_\beta$. These voltages could follow the ideal curves shown in the figure if the rectifiers had no capacitance and resistances $R_\alpha$ and $R_\beta$ were very small. Tests have shown that $E_\beta$ can be more easily improved than $E_\alpha$. It is therefore advisable to use $E_{c\alpha}$ directly instead of $E_\alpha$ for forming the left side of the period. By allowing $E_{c\alpha}$ and $E_\beta$ to pass through a class C amplifier the undesirable lower part of the voltage curves are cut off so that the combination $E_{c\alpha}$ and $E_\beta$ will provide impulses with two variable edges.

A slightly modified arrangement which may be used for the separate formation of the left and right impulse edges is shown in Figure 9. This arrangement differs from the one preceding in that the resistances $R_\alpha$ and $R_\beta$ are replaced by resistances $R'$ and $R''$ arranged in series with the parallel circuit formed by condensers $C_\alpha$ and $C_\beta$ with rectifiers $G_{1\alpha}$ and $G_{1\beta}$, respectively. The other elements are similar to and correspond to those of Figure 7.

With the arrangement shown in Figure 9, it is advantageous to obtain the desired impulses from the condenser voltages $E_{c\alpha}$ and $E_{c\beta}$. Voltage $E_{c\alpha}$, that is the voltage of condenser $C_\alpha$, may for instance be combined with the voltage drop $E_{R'}$ across resistance $R'$, so that a voltage curve such as is shown in Figure 10c is obtained. The charging current may become so small that the edge K in Figure 10a is not clearly defined whilst the edge K' remains quite sharp, since the discharge current is relatively large and remains unchanged. By superposing the voltage $E_{R'}$ from resistance $R'$ a clear and sharply defined right edge is obtained. The time-modulated impulses formed in this manner have a constant right and a variable left edge. The left impulse edge can be obtained directly from $E_{c\alpha} + R_{R'}$ by applying this voltage to the grid of an amplifier tube. The negative grid bias of this tube should be so selected that only the top part of the curve above the horizontal line shown in Figure 10 is allowed to pass.

The following possibilities exist for forming the right impulse edge:

(a) Voltage $E_{c\beta}$, i. e. the voltage across condenser $C_\beta$, is applied through a potential divider to the grid of a class A amplifier tube, a voltage $$-L \frac{dJa}{dt}$$

being taken from the terminals of an ideal reactor in the anode circuit of this tube. This voltage follows the shape shown in Figure 11b. Figure 11a shows $E_{c\beta}$ as a function of the time $t$.

(b) If the voltage drop $E_{R''}$ across resistance $R''$ is superposed on $E_{c\beta}$ the curve shown in Figure 12a is obtained. Similarly as in the case of Figure 10, the lower part of the voltage curve can be cut off by passing it through a class C amplifier. A voltage $E_a$ as shown in Figure 12b is then formed across an ohmic anode resistance. If $E_a$ is added to the signal $E_R$ which is displaced by 90° the right edge is obtained directly. This is shown in Figure 13. Part a of this figure shows the signal $E_R$ and the voltage impulses $E_a$ of Figure 12b from which by addition the impulses RJ of Figure 13b are formed, the right edges of these impulses indicated by $v$ being variable.

It has been found that with the time modulation method according to the invention the distortion factor is very small, if ideal constructional elements are available. This is, however, not always the case, and particularly the lower part of the charging tube $V_E$ characteristic causes considerable distortion with a high degree of modulation. A 100% modulation means that signals and intervals occur which are as short as desired. In other words a moment occurs where the charging current $J_e$ which flows through the tube $V_L$ to condenser C becomes as small as desired. At this instant tube $V_L$ operates in the lower part of the characteristic where there is no longer a linear relationship.

The charging current of condenser C can be reduced to a very small value without reducing the anode current $J_L$ to zero. This is achieved with the arrangement shown in Figure 14 by producing a compensation current $J_K$ in the opposite direction. This is obtained in a simple manner by providing a resistance R between the screen grid and cathode of discharge tube $V_E$. Since the voltage on the screen grid and thus also the voltage drop across resistance R is maintained constant by reactor $D_r$ and condenser $C'$, current $J_K$ is a constant direct current. This latter also flows during the discharging period and is not detrimental, since on the contrary the constant discharging current of tube $V_E$ can thus be reduced correspondingly.

Another arrangement for impulse time modulation is shown in Figure 15. In this case, impulses $U_1$ which represent the shape of the modulating voltage are applied to the control grid of tube $V_L$. The periodic discharge in this case is through a gas discharge tube $V_{GE}$ whose control grid is controlled for this purpose by the saw-tooth oscillations $U_2$ as shown in Figure 16b. Condenser C is charged to a varying degree according to the magnitude of the impulses $U_1$, and the higher the voltage to which it is charged the smaller will be the ignition voltage of tube $V_{GE}$; that is to say the sooner will the ignition caused by the saw-tooth voltage $U_2$ occur. This state of affairs is represented in Figure 16'. $E_c$, Figure 16a, indicates the condenser voltage and $U_2$, Figure 16b, the curve of the saw tooth shaped ignition voltage. The points of ignition are indicated by $Z_1$, $Z_2$ and $Z_3$. It is obvious that the ignition must not coincide with the charging process.

In the constructional examples of the invention shown in the drawings, a condenser is charged by a current depending on the instantaneous modulating signal, whereupon the stored power is discharged at constant current, so that the time of discharge depends on the accumulated energy. The invention is of course not restricted to this possibility. The power can also be stored for instance by means of an induction coil in the form of magnetic energy.

A fundamentally different constructional form of the invention may be realized if the message to be transmitted is recorded on a carrier. An example of such an arrangement is shown in Figure 17. The modulation signal $S_4$ recorded on a film carrier is produced by the translucent strips $S_t'$ which are the only translucent parts of the film. In order to produce electric time-modulated signals, the film is moved in the direction of the arrow and passes beneath the translucent strip $ST''$. This latter strip is continuously illuminated from above so that the time during which the light passes through both strips ST' and St'' simultaneously is a measure of the height of the strip St' being scanned, provided that the film moves at a constant speed. The pulses may be obtained for instance by means of a photo-electric cell located underneath the film near the translucent strip St'', the current of this cell indicating the duration of the light passage.

The voltages of the charging condensers as well as the charging or discharging currents of these condensers, depending upon the arrangement used, are all suitable for forming the time-modulated impulses. Generally, in forming the time-modulated impulses from these currents, it is advisable to use real or complex impedance from the terminals of which the desired voltage impulses may be desired.

We claim:

1. In a method of impulse time modulation, the steps of producing energy pulses of equal width and varying in amplitude in proportion to equally spaced momentary amplitudes of a modulating signal, and converting said energies into impulses of substantially constant amplitude and having at least one edge spaced from the edges of correspondingly equally spaced successive time periods by intervals varying in proportion to the amplitudes of the respective signal energies.

2. In a method of impulse time modulation, the steps of producing energy pulses of equal width and varying in amplitude in proportion to equally spaced momentary amplitudes of a modulating signal, and converting said energies into impulses of substantially constant amplitude having one edge coinciding with and having their opposite edges spaced from the correspondingly equally spaced edges of successive time periods by intervals varying in proportion to the amplitudes of the respective signal energies.

3. In a method of impulse time modulation, the steps of producing energy pulses of equal width and varying in amplitude in proportion to equally spaced momentary amplitudes of a modulating signal, and converting said energies into impulses of substantially constant amplitude and having both their edges spaced from the correspondingly equally spaced edges of successive time periods by intervals varying in proportion to the amplitudes of the respective signal energies.

4. In an impulse time modulation system, means for producing successive energy pulses of equal width and varying in amplitude in proportion to equally spaced momentary amplitudes of a modulating signal, and means for converting said energies into impulses of substantially constant amplitude and having at least one edge spaced from the edges of correspondingly equally spaced successive time periods at intervals varying in proportion to the amplitudes of the respective signal energies.

5. In an impulse time modulation system, means for producing successive energy pulses of equal width and varying in amplitude in proportion to equally spaced varying amplitudes of a modulating signal, and means for converting said energies into impulses of substantially constant amplitude having one edge coinciding with and having their opposite edges spaced from the correspondingly equally spaced edges of successive time periods by intervals varying in proportion to the amplitudes of the respective signal energies.

6. In an impulse time modulation system, means for producing energy pulses of equal width and varying in amplitude in proportion to equally spaced momentary amplitudes of a modulating signal, and means for converting said energies into impulses of substantially constant amplitude and having both their edges spaced from the correspondingly equally spaced edges of successive time periods at intervals varying in proportion to the amplitudes of the respective signal energies.

7. In an impulse time modulation system, means for successively interrupting a modulating signal to produce successive energy pulses of substantially equal length and spacing and having amplitudes representative of the respective momentary signal amplitudes, and means for converting said energy pulses into impulses of substantially constant amplitude and having at least one edge spaced from the correspondingly equally spaced edges of successive time periods by intervals varying in proportion to the amplitudes of the respective signal energies.

8. In an impulse time modulation system, means for successively interrupting a modulating signal to produce successive energy pulses of substantially equal length and spacing having amplitudes representative of the respective momentary signal amplitudes, an energy storage device, a constant current device connected to said storage device, and means for successively storing said energy pulses upon said storing device and to subsequently discharge the stored energy through said device during the pulse spacing intervals.

9. In an impulse time modulation system, means for periodically interrupting a modulating signal voltage to produce successive voltage pulses of substantially equal length and spacing and having amplitudes representative of the respective momentary signal amplitudes, a condenser, a constant current device connected across said condenser, and means for successively charging said condenser by said voltage pulses and subsequently discharging it through said device during the pulse spacing intervals.

10. In an impulse time modulation system, means for periodically interrupting a modulating signal voltage to produce successive voltage pulses of substantially equal length and spacing and having amplitudes representative of the respective momentary signal amplitudes, a condenser, a pentode discharge tube having its anode-cathode path connected across said condenser, means for charging said condenser by said voltage pulses and successively discharging it through said tube during the pulse spacing intervals, and load impedance means in series with said condenser and tube for deriving a pulse time modulated output voltage.

11. In an impulse time modulation system, means for periodically interrupting a modulating signal voltage to produce successive voltage pulses of substantially equal length and spacing and having amplitudes representative of the respective momentary signal amplitudes, a condenser, a pentode discharge tube having its anode-cathode path connected across said condenser, means for charging said condenser by said voltage pulses and successively discharging it through said tube during the pulse spacing intervals, a uni-directional impedance connected across said condenser and having a current passing direction in respect to said condenser being opposite to the current passing direction of said tube, and a load impedance in series with said uni-directional impedance for deriving a pulse time modulated output voltage.

12. In an impulse time modulation system, means for periodically interrupting a modulating signal voltage to produce successive voltage pulses of substantially equal length and spacing and having amplitudes representative of the respective momentary signal amplitudes, a condenser, a pentode discharge tube having its anode-cathode path connected across said condenser, means for charging said condenser by said voltage pulses and successively discharging it through said tube during the pulse spacing intervals, means to prevent current flow through said tube during the condenser charging periods, and load impedance means in series with said condenser and tube for deriving a pulse time modulated output voltage.

13. In an impulse time modulation system, means for interrupting a modulating signal voltage to produce successive voltage pulses of substantially equal length and spacing, and having amplitudes varying in proportion to the momentary signal amplitudes, a first electron discharge tube having at least a cathode, a control grid, and an anode, a condenser connected between said anode and cathode, means for applying said voltage pulses to said grid to intermittently charge said condenser to a varying voltage in accordance with the respective pulse amplitudes, a second electron discharge tube having a cathode, a control grid, a screen grid, a suppressor grid, and an anode, and having its anode-cathode path connected in series with the anode-cathode path of said first discharge tube, whereby to discharge said condenser at substantially constant current during the pulse spacing intervals, and load impedance means in the discharge path of said condenser for deriving a pulse time modulated output voltage.

14. In an impulse time modulation system, means for interrupting a modulating signal voltage to produce successive voltage pulses of substantially equal length and spacing and having amplitudes varying in proportion to the momentary signal amplitudes, a first electron discharge tube having at least a cathode, a control grid, and an anode, a condenser connected between said anode and cathode, means for applying said voltage pulses to said grid to intermittently charge said condenser to a varying voltage in accordance with the respective pulse amplitudes, a second electron discharge tube having a cathode, a control grid, a screen grid, a suppressor grid, and an anode, and having its anode-cathode path connected in series with the anode-cathode path of said first discharge tube, whereby to discharge said condenser at substantially constant current during the pulse spacing intervals, means for biasing the control grid of said second tube to prevent discharge current therethrough during the charging periods of said condenser, and load impedance means in the discharge circuit of said condenser for deriving a pulse time modulated output voltage.

15. In an impulse time modulation system, means for interrupting a modulating signal voltage to produce successive voltage pulses of substantially equal length and spacing and having amplitudes varying in proportion to the momentary signal amplitudes, a first electron discharge tube having at least a cathode, a control grid, and an anode, a condenser connected between said anode and cathode, means for applying said voltage pulses to said grid to intermittently charge said condenser to a varying voltage in accordance with the respective pulse amplitudes, a second electron discharge tube having a cathode, a control grid, a screen grid, a suppressor grid, and an anode, and having its anode-cathode path connected in series with the anode-cathode path of said first discharge tube, whereby to discharge said condenser at substantially constant current during the pulse spacing intervals, a unidirectional impedance connected across the anode-cathode path of said second tube to maintain a predetermined steady discharge current therethrough, means for biasing the control grid of said second tube to prevent a discharge therethrough during the charging periods of said condenser, and load impedance means in the discharge circuit of said condenser and said second tube for deriving a pulse time modulated output voltage.

16. In an impulse time modulation system, means for interrupting a modulating signal voltage to produce successive voltage pulses of substantially equal length and spacing and having amplitudes varying in proportion to the momentary signal amplitudes, a first electron discharge tube having at least a cathode, a control grid, and an anode, a condenser connected between said anode and cathode, means for applying said voltage pulses to said grid to intermittently charge said condenser to a varying voltage in accordance with the respective pulse amplitudes, a second electron discharge tube having a cathode, a control grid, a screen grid, a suppressor grid, and an anode, and having its anode-cathode path connected in series with the anode-cathode path of said first discharge tube, whereby to discharge said condenser at substantially constant current during the pulse spacing intervals, a unidirectional impedance connected across said second tube to pass a predetermined steady discharge current therethrough, means for biasing the control grid of said second tube to prevent a discharge therethrough during the charging periods of said condenser, and load impedance means connected in series with said unidirectional impedance for deriving a pulse time modulated output voltage.

17. In an impulse time modulation system, means for periodically interrupting a modulating signal voltage to produce successive voltage pulses of substantially equal length and spacing and having amplitudes representative of the respective instantaneous signal amplitudes, a condenser, a resistance, a pentode discharge tube having its anode-cathode path connected across said condenser in series with said resistance, and means for charging said condenser by said voltage pulses and discharging it through said tube during the pulse spacing intervals.

18. In an impulse time modulation system, means for periodically interrupting a modulating signal voltage to produce successive voltage pulses of substantially equal length and spacing and having amplitudes representative of the respective instantaneous signal amplitudes, a condenser, a resistance, a pentode discharge tube having its anode-cathode path connected across said condenser in series with said resistance, means for charging said condenser by said voltage pulses and discharging it through said tube during the pulse spacing intervals, a uni-directional impedance connected across said condenser and having a current passing direction in respect to said condenser being opposite to the current passing direction of said tube, and means for biasing said tube to prevent a discharge of said condenser therethrough during the charging periods of said condenser.

19. In an impulse time modulation system, means for interrupting a modulating signal voltage to produce successive voltage pulses of substantially equal length and spacing and having amplitudes varying in proportion to the momentary signal amplitudes, a first electron discharge tube having at least a cathode, a control grid, and an anode, a resistance, a condenser connected between said cathode and anode in series with said resistance, means for applying said voltage pulses to said grid to intermittently charge said condenser to a varying voltage in accordance with the respective pulse amplitudes, a second electron discharge tube having a cathode, a control grid, a screen grid, a suppressor grid, and an anode and having its anode-cathode path connected in series with the anode-cathode path of said first tube, whereby to discharge said condenser at substantially constant current during the pulse spacing intervals, and a uni-directional impedance connected across said condenser and having a current passing direction in respect to said condenser opposite to the current passing direction of said second tube.

20. In an impulse time modulation system, means for interrupting a modulating signal voltage to produce successive voltage pulses of substantially equal length and spacing and having amplitudes varying in proportion to the momentary signal amplitudes, a first electron discharge tube having at least a cathode, a control grid, and an anode, a resistance, a condenser connected between said cathode and anode in series with said resistance, means for applying said voltage pulses to said grid to intermittently charge said condenser to a varying voltage in accordance with the respective pulse amplitudes, a second electron discharge tube having a cathode, a control grid, a screen grid, a suppressor grid, and an anode and having its anode-cathode path connected in series with the anode-cathode path of said first tube, whereby to discharge said condenser at substantially constant current during the pulse spacing intervals, a uni-directional impedance connected across said condenser and having a current passing direction in respect to said condenser opposite to the current passing direction of said second tube to maintain a predetermined steady discharge current through said second tube, and means for biasing the control grid of said second tube to prevent a discharge therethrough of said condenser during the condenser charging periods.

21. In an impulse time modulation system, means for interrupting a modulating signal voltage to produce successive voltage pulses of substantially equal length and spacing and having amplitudes varying in proportion to the momentary signal amplitudes, a condenser, a pentode discharge tube having a cathode, a control grid, a screen grid, a suppressor grid, and an anode and having its anode-cathode path connected across said condenser, means for charging said condenser by said voltage pulses and successively discharging it through said tube during the pulse spacing intervals, a uni-directional impedance connected across the anode-cathode path of said tube and having a current passing direction in respect to said condenser being opposite to the current passing direction of said tube, a choke coil connected between the anode and screen grid of said tube, a further condenser connected between the screen grid and cathode of said tube, and means for biasing said control grid to substantially prevent a discharge of said condenser during the charging periods thereof.

22. In an impulse time modulation system, means for interrupting a modulating signal voltage to produce successive voltage pulses of substantially equal length and spacing and having amplitudes varying in proportion to the momentary signal amplitudes, a condenser, a pentode discharge tube having a cathode, a control grid, a screen grid, a suppressor grid, and an anode and having its anode-cathode path connected across said condenser, means for charging said condenser by said voltage pulses and successively discharging it through said tube during the pulse spacing intervals, a uni-directional impedance connected across the anode-cathode path of said tube and having a current passing direction in respect to said condenser being opposite to the current passing direction of said tube, a choke coil connected between the anode and screen grid of said tube, a condenser-shunted resistance connected between the screen grid and cathode of said tube, and means for biasing said control grid to substantially prevent discharge of said condenser during the charging periods thereof.

23. In an impulse time modulation system, means for interrupting a modulating signal voltage to produce successive voltage pulses of substantially equal length and spacing and having amplitudes varying in proportion to the momentary signal amplitudes, a condenser, a gaseous discharge tube having a cathode, an anode, and a control grid and having its anode-cathode path connected across said condenser, means for successively charging said condenser by said voltage pulses and subsequently discharging it through said tube during the pulse spacing intervals, and means for applying a periodic linear sweep voltage to said control grid in synchronism with the condenser discharging periods.

GUSTAV GUANELLA.
PAUL GÜTTINGER.

REFERENCES CITED

The following references are of record in the file of this patent:

UNITED STATES PATENTS

| Number | Name | Date |
|---|---|---|
| 1,887,237 | Finch | Nov. 8, 1932 |
| 2,061,734 | Kell | Nov. 24, 1936 |
| 2,227,596 | Luck | Jan. 7, 1941 |
| 2,252,293 | Ohl | Aug. 12, 1941 |
| 2,280,707 | Kell | Apr. 21, 1942 |